No. 12,233. REISSUED JUNE 21, 1904.

E. BATAULT.

FOLDING OPERA GLASS.

APPLICATION FILED JAN. 4, 1904.

2 SHEETS—SHEET 1.

Witnesses:

Jas. F. Coleman

Jno. Robt. Taylor

Inventor

Emile Bataulty

By Dyer & Dyer

Attorneys.

No. 12,233. REISSUED JUNE 21, 1904.

E. BATAULT.

FOLDING OPERA GLASS.

APPLICATION FILED JAN. 4, 1904.

2 SHEETS—SHEET 2.

Witnesses:

Jas. F. Coleman

Jno. Robt Taylor

Inventor

Emile Bataault,

By Dyer & Dyer

Attorneys.

No. 12,233. Reissued June 21, 1904.

UNITED STATES PATENT OFFICE.

EMILE BATAULT, OF GENEVA, SWITZERLAND, ASSIGNOR TO SUSSFELD, LORSCH & CO., OF NEW YORK, N. Y., A COPARTNERSHIP.

FOLDING OPERA-GLASS.

SPECIFICATION forming part of Reissued Letters Patent No. 12,233, dated June 21, 1904.

Original No. 706,512, dated August 12, 1902. Application for reissue filed January 4, 1904. Serial No. 187,743.

*To all whom it may concern:*

Be it known that I, EMILE BATAULT, a citizen of the Republic of Switzerland, residing at Geneva, in the canton of Geneva, Switzerland, have invented a certain new and useful Improvement in Folding Opera-Glasses, of which the following is a description.

My invention relates to improvements in folding opera-glasses; and the object is to provide a device of this kind which shall be simple and cheap of construction and which can be folded into little compass when not used.

Broadly stated, the invention comprises a suitable frame which carries the objectives pivotally mounted thereon, so as to be capable of occupying either a plane parallel or perpendicular to the longitudinal axis of the device, said frame also carrying eyepiece-lenses, with means for adjusting the same, so as to focus them with respect to the objectives, and the frame being combined with a folding or expansible case adapted to be opened to permit the movement of the objectives to their operative position.

In order that the invention may be better understood, attention is directed to the accompanying drawings, forming part of this specification, and in which—

Figure 1:
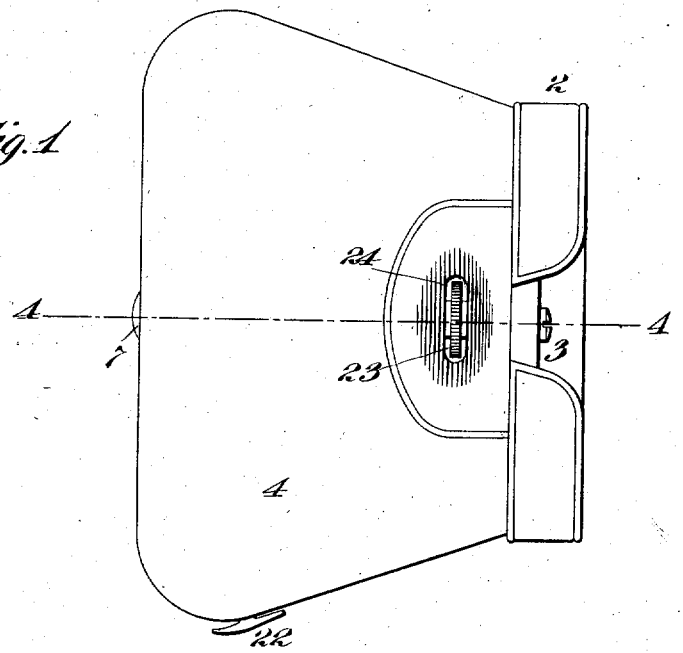
Figure 2:
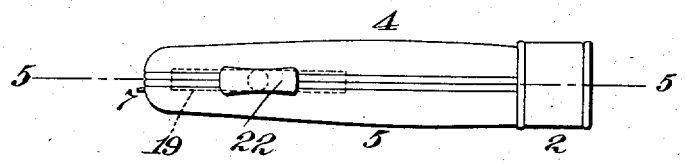
Figure 3:
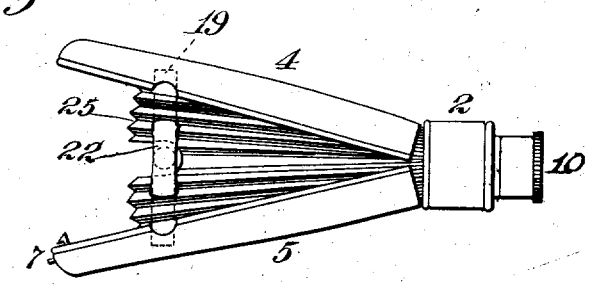
Figure 4:
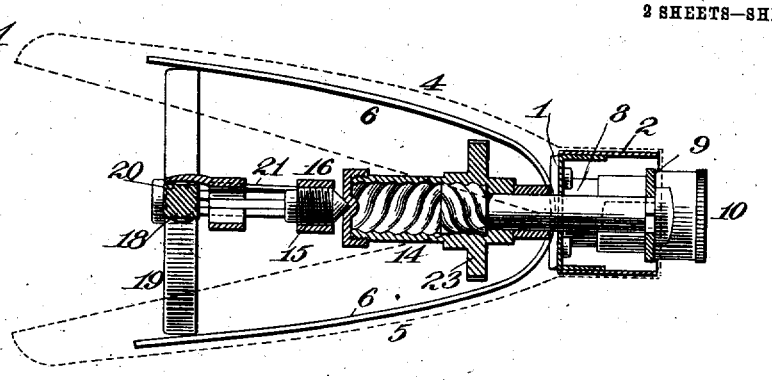
Figure 5:
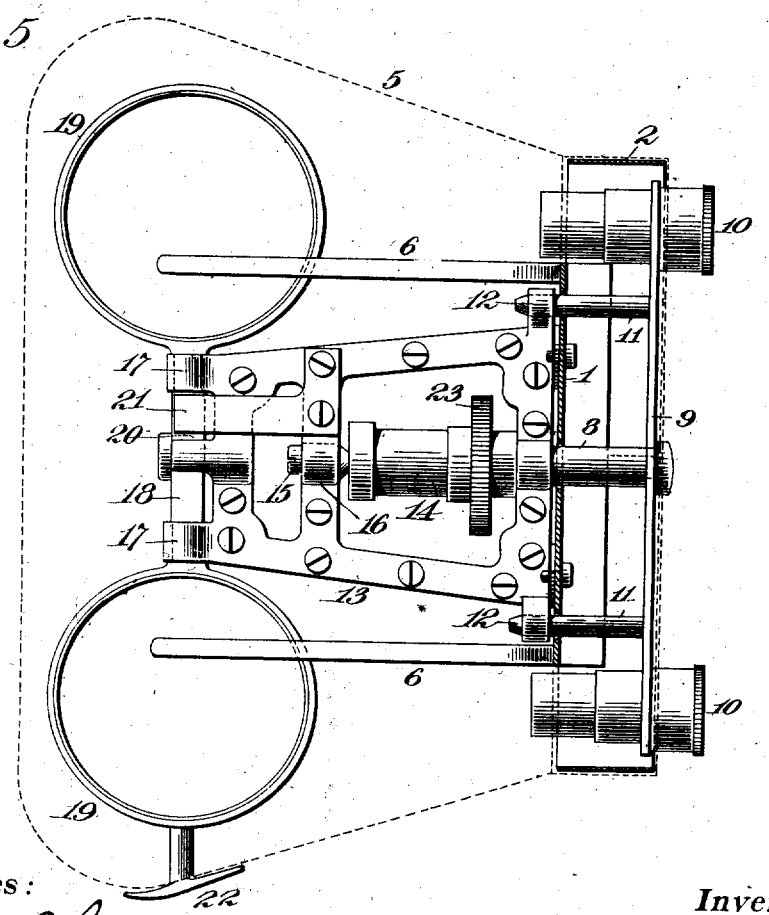

Figure 1 is a plan view of the device, showing the same folded with the eyepiece-lenses retracted; Fig. 2, a side view of the same; Fig. 3, a similar view showing the device open with the eyepiece-lenses moved to their maximum position; Fig. 4, a section on the line 4 4 of Fig. 1, showing the case in dotted lines; and Fig. 5, a section on the line 5 5 of Fig. 2, also showing the case in dotted lines.

In all of the views corresponding parts are represented by the same numerals of reference.

1 represents the main plate of the frame, to which is secured a light steel band 2, preferably having a cut-away nose-opening 3 therein. Flexibly secured to the band 2 are the two sections 4 and 5 of the case made, preferably, of a stiff material, so arranged that relative movement of the case-sections from the position shown in Fig. 2 to that shown in Fig. 3 will be provided. The edges of the sides and free ends meet when closed, as shown, the rigid nature of the material of which the sections are formed causing the sections to always retain their shape without the need of additional or extraneous strengthening means and the curved configuration of the sections obviating the necessity of using end or side coverings for the casing when closed. These case-sections are normally opened by steel leaf-springs 6, either fixed to the case (see Fig. 4) or which may be fixed to the frame and may be closed and locked in the position shown in Fig. 2 by a latch 7 of any suitable form, the engaging members of which are connected to the edges of the case-sections 4 and 5. Passing through the plate 1 of the frame is an adjusting-rod 8, carrying a plate 9 at its end, to which are secured the tubes 10, containing the eyepiece-lenses. The plate 9 is guided in its movements toward and away from the plate 1 by the guide-rods 11, passing through openings in the plate 1 and through sockets 12 in the frame 13. Surrounding the adjusting-rod 8 is a nut 14, having a threaded connection with said rod, as shown, so that the turning movements of the nut will move the plate 9 toward and away from the plate 1 to properly focus the glass. The nut 14 is guided at its free end by an adjusting-screw 15, passing through a cross-piece 16 in the frame 13. The frame 13 is also provided with sockets 17 at its free end, which carry a shaft 18, to the ends of which are secured the objectives 19. The shaft 18 can be turned so as to dispose the objectives 19 in a plane parallel to the axis of the device, as in Fig. 2, when the glass is closed, or to a plane perpendicular to that axis, as in Fig. 3, when the glass is open. The shaft 18 is provided with a squared portion 20, with which a spring 21 coöperates, so as to frictionally lock the objectives in either position. A finger-piece 22 extends outside of the case, as shown, to one side, and by means of which the objectives will be turned when desired. The nut 14 is provided with a thumb-wheel 23, by means of which it may be adjusted, and which is disclosed through openings 24 in the sections 4 and 5 of the case. These sections are connected by bellows 25 on each side, so as to exclude light.

The portions of the case-sections immediately adjacent to the openings 24 are depressed, as shown by the shading in Fig. 1, so that the thumb-wheel may be actuated when the case-sections are expanded as well as when closed.

Normally the parts will occupy the position shown in Fig. 2, the objectives extending in a plane with the frame 13 and the case-sections 4 and 5 being locked together. When the device is to be used, the case-sections are unlocked, and the springs 6 force them apart. The objectives are now turned to the position shown in Fig. 3, and the eyepiece-lenses are properly adjusted by turning the nut 14.

Having now described my invention, what I claim is—

1. In a folding opera-glass, the combination with a frame, of two case-sections hinged to the said frame, bellows between said case-sections and springs for separating the same, eyepiece-lenses carried by said frame, objectives pivoted to said frame, the free edges of the case-sections being locked in the closed position by a latch, substantially as and for the purposes set forth.

2. In a folding opera-glass, the combination with a frame, of two case-sections hinged to said frame, bellows between said case-sections, eyepiece-lenses carried by said frame, objectives pivoted to said frame, and a finger-piece extending to one side for the purpose of turning said objectives, substantially as and for the purposes set forth.

3. In a folding opera-glass, the combination with a frame, of two case-sections hinged to said frame, bellows between said case-sections, eyepiece-lenses carried by said frame, objectives pivoted to said frame, a finger-piece extending to one side for the purpose of turning said objectives, the free edges of the case-sections being locked in the closed position by a latch, substantially as and for the purposes set forth.

4. In a folding opera-glass, the combination with a frame, of two case-sections hinged to said frame, bellows between said case-sections, and springs separating the same, eyepiece-lenses carried by said frame, objectives pivoted to said frame, and a thumb-wheel which is disclosed through openings in the case-sections, substantially as and for the purposes set forth.

5. In a folding opera-glass, the combination with a frame, of two case-sections hinged to said frame, bellows between said case-sections, eyepiece-lenses carried by the said frame, objectives pivoted to said frame, a thumb-wheel which is disclosed through openings in the case-sections, and depressions adjacent to such openings, substantially as and for the purposes set forth.

6. In a folding opera-glass, the combination with a frame, of two case-sections hinged to said frame, bellows between said case-sections, and springs separating the same, eyepiece-lenses carried by said frame, and objectives pivoted to said frame, substantially as and for the purposes set forth.

7. In a folding opera-glass, the combination with a frame, of two case-sections hinged to said frame, bellows between said case-sections and springs directly engaging with said case-sections for normally separating the same, eyepiece-lenses carried by said frame, and objectives pivoted to said frame, substantially as and for the purposes set forth.

8. In a folding opera-glass, the combination with a band, two case-sections hinged to said band, bellows between said case-sections, and springs directly engaging said case-sections for normally separating the same, of a frame within the case-sections, eyepiece-lenses carried by said frame, and objectives pivoted to said frame, substantially as and for the purposes set forth.

9. In a folding opera-glass, the combination with a band, two case-sections hinged to said band, bellows between said case-sections and springs directly engaging said sections for normally separating the same, of a frame within the case-sections, eyepiece-lenses carried by said frame, objectives pivoted to said frame, and means for adjusting the eyepiece-lenses with respect to the frame, substantially as and for the purposes set forth.

10. In a folding opera-glass, the combination with a band, two case-sections hinged to said band, bellows between said case-sections and springs directly engaging said sections for normally separating the same, of a frame within the case-sections, eyepiece-lenses carried by said frame, objectives pivoted to said frame, and means for locking the objectives in line with the frame or in a position at right angles thereto, substantially as and for the purposes set forth.

This specification signed and witnessed this 22d day of December, 1903.

EMILE BATAULT.

Witnesses:

L. H. MUNIER,

FILICIEN VULLIZ-SERMER.